INVENTOR.
Herbert C. Winkel.

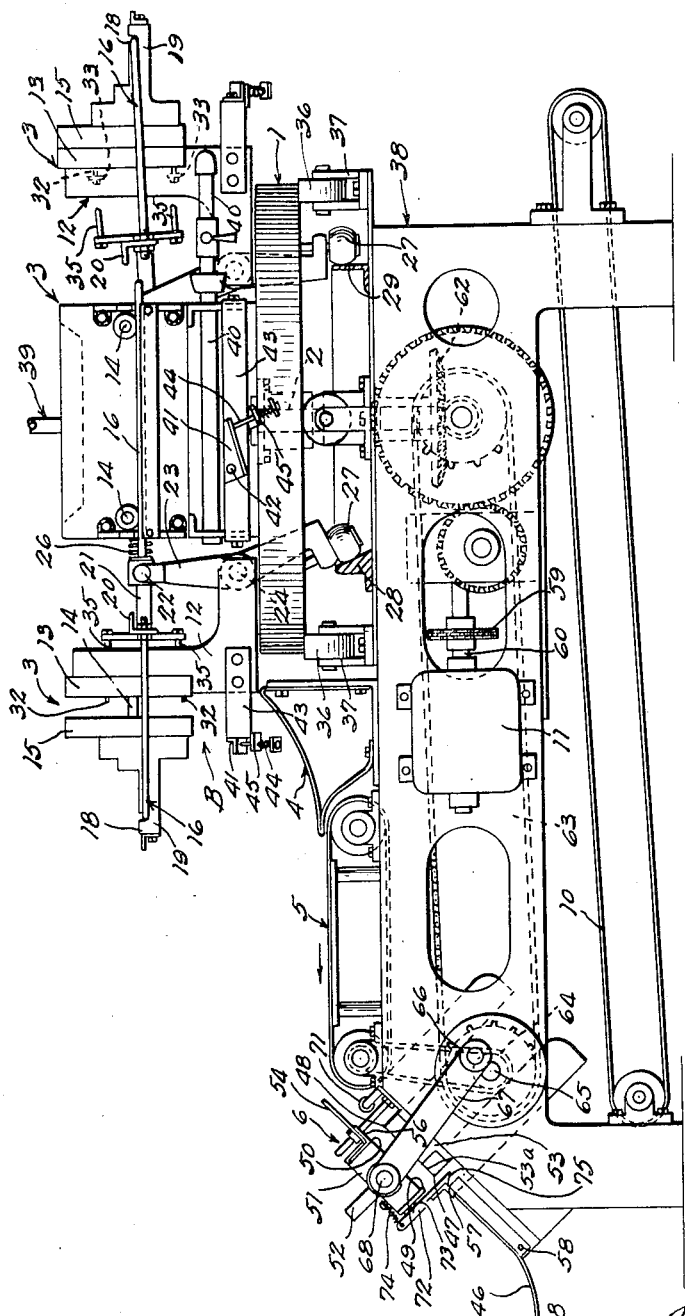

April 23, 1957 H. C. WINKEL 2,789,317
MULTIPLE MOLD GRID MOLDING, TRIMMING AND SORTING MACHINES
Original Filed Feb. 12, 1948 3 Sheets-Sheet 3
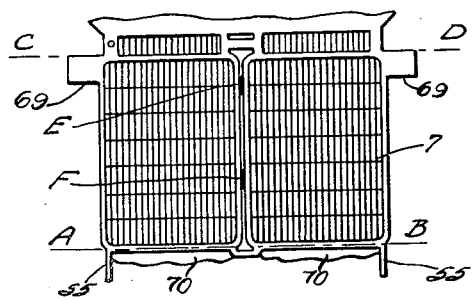
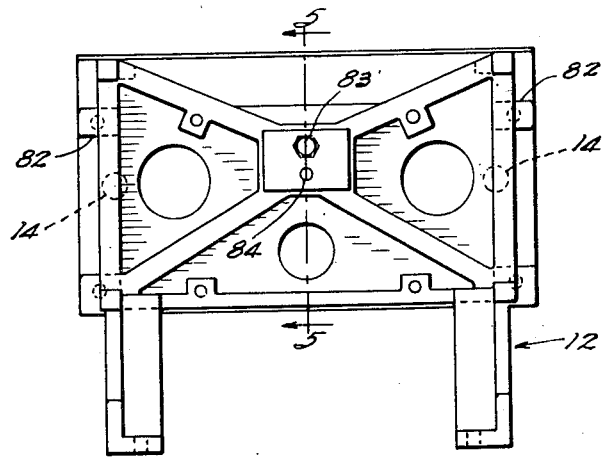
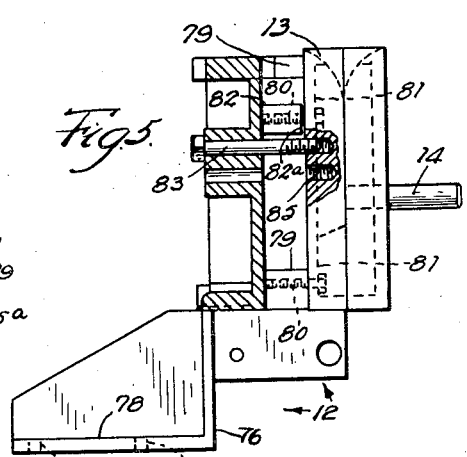
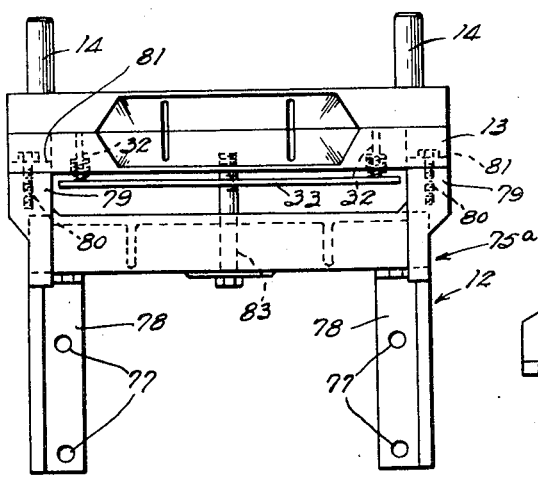
INVENTOR.
Herbert C. Winkel.
BY
Thiess, Olsen, Mecklenburger,
van Holst & Coltman. Pattys.

United States Patent Office 2,789,317
Patented Apr. 23, 1957

2,789,317

MULTIPLE MOLD GRID MOLDING, TRIMMING, AND SORTING MACHINES

Herbert C. Winkel, Watervliet, Mich.

Application August 20, 1952, Serial No. 305,320, which is a continuation of application Serial No. 7,804, February 12, 1948. Divided and this application November 23, 1954, Serial No. 470,677

8 Claims. (Cl. 18—34)

This invention relates to multiple mold grid molding, trimming and sorting apparatus. It is an object of the invention to provide improved apparatus of that character.

This application is a division of application Serial No. 305,320, filed August 20, 1952, which is in turn a continuation of application Serial No. 7,804, filed February 12, 1948, both of which are now abandoned.

Another object of the invention is to provide an improved nonwarping mold for battery grids or the like for minimizing the warping effect of heat on the mold sections which heat tends to separate the edges of the mold sections, causing objectionable flash at the periphery of the mold cavity.

Further objects and advantages of the invention will be apparent from the description and claims.

In the drawings in which an embodiment of my invention is shown,

Fig. 2 is a side elevation thereof;

Fig. 3 is a rear elevational view of a support for the grid molds;

Fig. 4 is a top plan view of the support with the molds in position thereon;

Fig. 5 is an end elevational view of the grid mold and support, parts being broken away, and Fig. 6 is a face view of a duplex grid before trimming.

Figure 1:
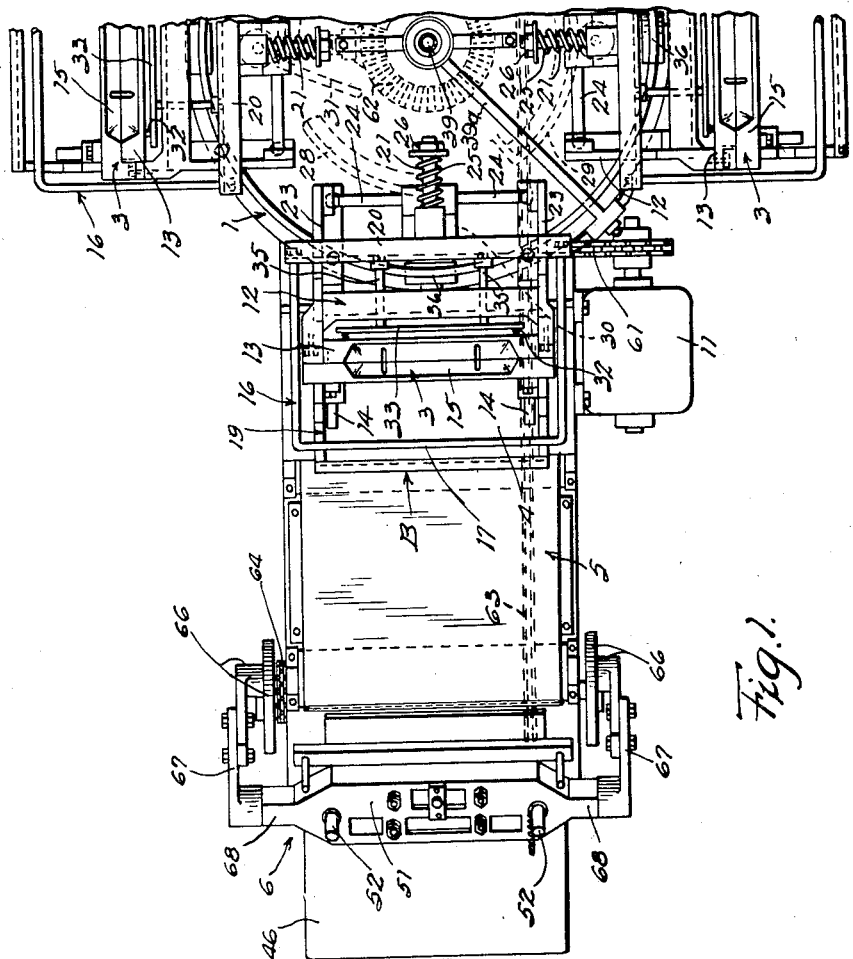
Figure 1 is a plan view of a multiple mold grid casting, trimming and sorting machine.
Figure 1:
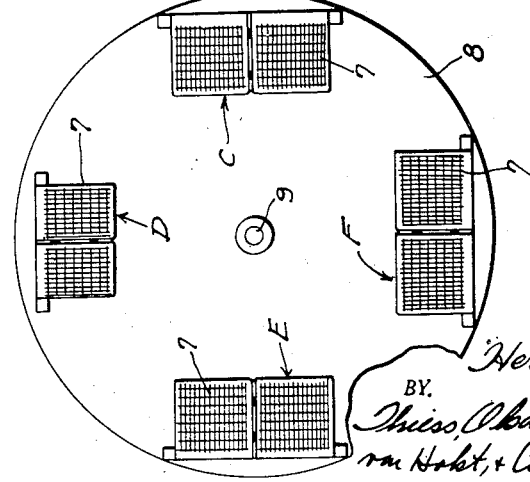

Referring to the drawings in detail, the construction shown comprises a grid mold carrying head or turret 1 rotatable with a vertical drive shaft 2, a plurality of grid molds 3 mounted on said turret, means for successively filling the grid molds with molten metal at a filling station at A which means may be of the general type shown in United States Letters Patent No. 2,638,982, issued May 19, 1953, to the same inventor, means for successively discharging the molded grids at B, a slide 4 onto which the grid falls when the mold is opened, curved to direct the grid from its vertical position to a substantially horizontal position, a substantially horizontal friction feed endless conveyor 5 to which the grid is delivered from the slide, a grid edge trimmer 6 adjacent the delivery end of the conveyor 5 to which the conveyor delivers the grid 7, a sorting or segregating table 8 rotatable with a vertical drive shaft 9 in synchronism with the rotatable mold carrying turret 1, to which table the grids 7 are delivered, one by one from the trimmer 6 and by which the grids from each mold are segregated from the grids from the other molds, an endless conveyor 10 for receiving the trimmings from the trimmer 6 and carrying them to a suitable discharge point, an electric motor 11 and transmission from the motor to the mold carrying turret 1, the friction feed conveyor 5, the trimmer 6, the sorting table 8, and the scrap conveyor 10.

Referring further to the grid molds 3, around the edge of the turret 1 are mounted a plurality of sets of upwardly and outwardly extending brackets 12. A suitable mold 3 is mounted on each comprising an inner mold section 13 fixedly secured to the bracket 12 and provided adjacent each side of the mold cavity with an outwardly extending guide rod or leader pin 14 on which latter is slidably mounted an outer mold section 15. The outer section 15 may, therefore, be freely moved on the leader pins to and from the inner section 13 by an operating mechanism which will now be described.

The mechanism for operating each mold-section 15 comprises a U-shaped yoke 16, the outer transverse span 17 thereof normally resting in notches 18 in a pair of outwardly extending brackets 19, which latter are rigidly secured to the outer face of the outer mold member 15. The outer mold-section 15 may, therefore, easily be removed at any time by merely raising the yoke or so-called bail 16, or may be moved outwardly on the guide rods 14 until engaged by the loop span 17 in order to separate the mold sufficiently to enable cleaning or spraying of the faces of the mold sections.

The inwardly extending arms of the yoke 16 are connected to a crossbar 20 to thereby form a loop extending completely around a mold 3. The bar 20 is provided with a rearwardly extending rod 21 pivoted at 22 on a lever 23, which latter extends through an opening in the turret 1 and is provided on the bracket 12 at 24. A compression spring 25 is mounted on the rod 21, which latter is slidable in the pivot of the lever 23, and the spring 25 may be adjusted by means of the nut 26 shown so that the mold-sections 13 and 15 may be clamped together with a suitable resilient pressure. The lever 23 is provided at its lower end with a rotatable cam follower 27, which follower is adapted for engagement with upwardly extending arcuate cams 28 and 29 on the frame of the machine. The cams 28 and 29 are concentrically positioned, and in Fig. 2 the mechanism at the left-hand side of the view illustrates the follower 27 in engagement with the inner surface of the cam 28 to thereby hold the associated mold in open position, while at the right-hand side of Fig. 2 the follower 27 is in engagement with the outer surface of the cam 29 to thereby hold the associated mold in closed position. The mold shown at the left of Figs. 1 and 2 is at the discharge station of the machine. The mold must, therefore, be open at that time.

The discharge cam 28 is provided with an outwardly inclined end portion 30 (Fig. 1) which is spaced from the adjacent end of the cam 29 to provide a passage therebetween for the follower 27. Therefore, when the follower leaves the cam 29, it will engage this outwardly extending flange 30 and the lower end of the lever 23 will be moved inwardly as the follower travels toward the main portion of the cam 28, and the outer section of the mold will, therefore, be moved outwardly to the open position as illustrated in Figs. 1 and 2.

The closing cam 29 is provided with an inwardly inclined portion 31 adjacent the end of the cam 28, and, therefore, when the follower 27 leaves the cam 28, it will engage this inturned portion 31 and move the follower outwardly onto the outer surface of the cam 29. This operation will move the outer section 15 of the mold inwardly to the position shown at the left of the drawings (Figs. 1 and 2) to thereby snugly close the mold. The molds are preferably open only a sufficient length of time to discharge the grid, and an inclined curved track or chute 4 is positioned at the discharge station and underneath the path of the molds as shown in Figs. 1 and 2, so that, when a mold is opened, the grid may be ejected therefrom and drop to the track 4 and be delivered to the grid trimmer 6 which will be described later.

In order to eject the grid, the fixed mold section 13 is provided with ejector pins 32 (Figs. 1 and 2) which extend through suitable holes 32a (Fig. 3) in the mold and bracket 12 and engage predetermined portions of the grid molded therein. These pins 32 are secured to a crossbar 33, and springs are mounted on the ejector pins to normally urge the crossbar 33 inwardly to engage the ends of the pins 35 which are secured to the crossbar 20 of the mold opening bail 16. During the outward mold opening movement of the loop 16, the bar 20 causes the ejector pins 32 to loosen the grid so that it drops downwardly onto the track 4 whereby it is directed to the grid trimmer.

The turret 1 may be supported for rotation by means of antifriction rollers 36 mounted in bearing brackets 37 secured to the frame or base 38.

It will be apparent that, by the use of a suitable driving transmission, the machine may be either continuously or intermittently operated. However, in either case, as soon as the mold is moved from the discharge station and is closed at filling station A by engagement of the closing follower 27 with the cam 31, the mold is filled preferably by means of an automatic pump and suitable mechanism not shown and which may be controlled in synchronism with the movement of the molds. By the time the filled mold has reached the discharge station at B, the metal is sufficiently hardened so that the grid may be ejected by the mechanism just described.

In molding battery grids, it is desirable that the mold should be retained at a predetermined temperature during the operation of the machine. This may be accomplished in any suitable manner. However, in the present embodiment a gas conduit 39 leads from any suitable gas pressure source and is connected to branch conduits 40 above the table by means of a connecting conduit 39a. The branch conduits 40 may be secured to the turret for rotation therewith and are each provided with a burner (not shown) positioned under an associated mold. By this means the molds may be retained at any required temperature. A similar construction is shown in my Patent No. 2,278,815, dated April 7, 1942.

As previously stated the means for successively filling the grid molds with molten metal at the filling station at A may be of the general type shown in Patent No. 2,638,982, previously referred to. A cylinder and piston pump, which may be like that shown in Patent No. 2,638,982, which is given one complete stroke every time a mold is presented at station A for filling, discharges a definite amount of molten metal which is supplied to the mold. The length of the stroke of the piston and hence the amount of molten metal supplied to each mold presented for filling is determined by a plurality of inclined flanged cams 41, one for each mold secured to travel with the mold and adjustable to vary the stroke of the pump. This cam, best seen in Fig. 2, is adjustably mounted to swing about a pivot pin 42 on a bracket 43 secured to the rotatable turret 1 and adjustable to any desired position of inclination by means of a bolt 44 threaded in a bracket 45 secured to the turret and having its end bearing on the pivoted cam 41. By adjusting the bolt in the bracket the inclination of the cam can be varied so that when this cam 41 engages a pump actuating follower the length of travel of the follower will be varied by the change of inclination of the cam, thus varying the amount of molten metal supplied to the mold. Thus, by properly setting the cams 41, the attendant can insure that the mold cavities may be properly filled regardless of size.

Referring further to the trimmer 6 and the means for advancing the grids from the grid molds to the trimmer and sorter, these comprise the arcuate slide 4 on which the grid falls when the molds are opened, curved to direct the grid from its vertical position to a substantially horizontal position, the horizontal endless conveyor 5 to which the grid is delivered from the curved slide 4, the grid edge trimmer 6 adjacent the delivery end of the conveyor 5 to which the conveyor delivers the grid, and an inclined curved chute 46 to which the trimmer delivers the grid and which delivers the grid to the sorter 8.

The trimmer 6 comprises a pair of stationary trimming edges 47 and 48, one for the front and one for the rear edge of the grid, and a pair of reciprocating shearing blades 49 and 50 mounted on a reciprocable head 51, the movable blades 49 and 50 cooperating with the stationary blades 47 and 48, respectively. The head 51 is guided in its movement by the leader pins 52 secured to the base 53 of the trimmer. The trimmer has a grid-supporting face 53a inclined downwardly and away from the delivery end of the endless conveyor 5, along which face the grid slides to trimming position.

The grids are fed to the trimmer in timed relation with respect to the operation of the trimmer by a grid stop plate 54 caused to reciprocate in timed relation to the trimmer head 51. When the stop plate 54 is in its lowered stop position, it will be engaged by the lugs 55 (Fig. 6) cast on the front edge of the grid being fed forwardly by means of the endless conveyor 5. This will hold the grid against further movement, the conveyor simply sliding underneath the grid. The stop plate 54 will be held in stop position during a substantial portion of the trimming movement of the trimmer head. When the trimmer head is approaching its upper position, the hooks 56 on the trimmer head will engage underneath the stop plate 54 and lift it out of its obstructing position so that the conveyor 5 can feed the grid forwardly to a position in which it will be delivered and slide onto the inclined grid-supporting face 53a of the trimmer 6.

For stopping the grid in correct trimming position an oscillatable stop bar 57 is provided which, in grid-locating position is engaged by the pair of forwardly-extending lugs 55 which are cast on the grid. These lugs are at opposite sides of the grid casting, thus affording widely spaced supports for the grid while being trimmed.

As soon as the trimmer head has trimmed the front and rear edges of the plate and the reciprocable shearing blades 49 and 50 have lifted clear of the stationary shearing edges 47 and 48, the further upward movement of the trimmer head will lift the pivoted retaining bar 57 which is oscillatable about an axis at 58 and allow the trimmed grid to fall down onto the guide 46 leading to the grid segregating and stacking mechanism.

Figs. 1 and 2 illustrate the grid segregating and stacking mechanism which comprises the table 8 mounted to rotate with the shaft 9 which is driven from the motor 11 in synchronism with the turret 1. While not of particular importance, the direction of rotation of the turret 1 and table 8 may be clockwise, as viewed in Fig. 1. The table 8 is positioned adjacent the end of the chute 46 so that the discharged grids will be delivered to the table therefrom, and is provided with a plurality of assembling or sorting stations corresponding in number to the number of molds used on the machine. In the present instance, four molds are used, and therefore there are four assembling stations, C, D, E and F, on the table 8, as shown in Fig. 1. The transmission between the drive shaft and the assembling table is of such ratio that all of the grids from a single mold are assembled in a group or stack at the same station on the assembling table. By this means, if any mold is defective, all defective grids therefrom will be assembled at one station. Also it will immediately be apparent that the corresponding mold is the defective one. Furthermore, defective grids from any single mold will not be mixed with perfect grids from the other molds and may readily be found and disposed of. Also if a mold is found to produce defective grids, it is not necessary to stop the machine until the end of the run, as the defective molds will be segregated from the perfect ones, or, if desired, the defective mold need not be poured.

Another advantage of the sorter in connection with the multiple mold machine is that it enables the machine to mold a number of different lengths of duplex grids at the same time, a different length grid from each mold, if desired, and to segregate these so that grids from each mold will be separated from the grids from the other molds, thus getting grids of the same length together in one group. As the heights of these grids are usually the same for the different lengths, the same trimmer may be used in all of the grids as the trimmer operates only on the advance edge and on the rear edge of the grid.

The transmission from the motor to the rotatable turret 1 comprises a sprocket wheel 59 mounted on the motor shaft 60, a sprocket chain 61 running over this sprocket wheel, a bevel gear 62 rotatable with the vertical shaft 2 on which the turret head 1 is mounted, and transmission of any usual or suitable type of reduction gearing from the sprocket chain 61 to the bevel gear 62. The transmission from the bevel gear 62 to the trimmer 6 comprises a sprocket chain 63 driven from the motor 11 through any suitable reduction gearing, a sprocket wheel 64 over which this chain 63 runs, a shaft 65 rotatable with this sprocket wheel 64, a pair of cranks 66 rotatable with the shaft 65, a pair of connecting rods or links 67 pivotally connected with the crank pins of the cranks 66, and the reciprocating head or ram 51 slidably mounted on the leader pins 52 and pivotally connected at 68 with the upper ends of the connecting rods 67.

The untrimmed grid 7 is shown in Fig. 6. It is provided with the usual lugs 69 which, when assembled in a battery, form the terminal post for the battery. In casting these battery grids, a flash or fin 70 forms on the lower edge of the grid, due to the provision for the venting of air at the bottom of the mold. In order to provide a grid casting which will engage properly with the grid-retaining feed bar 54 and the grid-retaining discharge bar 57, there is cast on the advance edge of the grid casting a pair of positioning lugs 55 by use of the method and apparatus disclosed in United States Letters Patent No. 2,467,246, issued April 12, 1949, to the same inventor. These lugs are cast sufficiently long so as to extend in advance of the most advanced portions of the overflow fin or flash. This enables the lugs 55 to engage the positioning bars of the trimming machine to position accurately the grid casting as it is being trimmed. The advance blade trims along the line A—B of Fig. 6 and the rear blade trims along the line C—D of Fig. 6. With the grid thus trimmed, it is a simple matter to break the two grid sections apart by hand, the fracture taking place at the two points E and F which are the only points of connection of the trimmed grid sections.

In order to facilitate the entry of the grid casting into the trimmer, a transversely-extending roller 71 may be mounted between the discharge end of the conveyor and the entrance edge of the trimmer.

In order to lift the locating bar 57 from its grid-holding position, a lifting hook 72 is provided pivotally mounted on the trimmer head 51 at 73 and spring-pressed toward the bar 57 by means of a coil tension spring 74. As the trimmer head moves down, the sloping edge 75 of the hook 72 will engage the bar 57 and the hook will slide down past the lower edge of the bar and will then snap into position underneath the bar. After the trimmer head has effected its trimming operation and has moved upwardly sufficiently to disengage the shearing blade 49 from the grid being trimmed, the shoulder on the hook will engage the lower edge of the bar 57 and lift the bar upwardly to release the grid to enable it to slide underneath the bar onto the guide 46. As the shearing head 51 continues to move upwardly, the relative paths of movement of the retaining bar 57 and hook 72 will be such that the hook will disengage the bar, allowing it to drop downwardly into position to intercept the advance edge of the succeeding grid delivered to the grid trimmer.

In grid molds it has been found that the heating of the grid sections, due to the molten metal, tends to cause the outer edges of the mold sections to bow away from each other, causing objectionable leakage of the molten metal cavity, resulting in excessive flash or fin formation. In order to overcome this objectionable bowing of the mold sections, I may use sections such as shown in Figs. 3, 4 and 5. The support for the mold is a cast bracket 12 having a base portion 76 secured to the turret 3 by means of bolts extending through holes 77 in the lower flanges 78 of the casting. The upright portion of the support has four pads or feet 79 adjacent its four corners which have finished faces for engagement with finished faces on the inner mold section 13. The inner mold section 13 is secured in place on the support by means of two pairs of bolts 80, the lower pair being swivelled in side flanges 81 in the inner mold section and being threaded into the lower pair of pads 79 extending from the face of the bracket 12 and the upper pair being swivelled in holes in the flanges 81 and being threaded into an intermediate pair of pads or bosses 82. By means of these detachable and attachable mold sections 13 and the mold sections 15 carried thereby, molds with wide cavities may be substituted for molds with narrow cavities when desired, and vice versa. The outer faces of the bosses 82 terminate short of the outer face of the mold section 13, as shown at 82a, so that the bolts 80 may be screwed into the bosses far enough to hold the mold section snugly in engagement with the pads 79 on the bracket 12.

In order to effect the desired initial slight warping of the mold section 13 to secure uniform grid thickness, a bolt 83 is provided extending through a hole in the support and threaded into the inner mold section as shown in Figs. 3, 4 and 5. In order to provide selective positions for the bolt in adjusting or warping the mold section as effected by a grid casting design, a second hole 84 may be provided in the support and a second tapped hole 84 may be provided in the mold section so that the mechanic may have some choice in a selection for the location of the warping bolt. As previously indicated, the outer mold section is slidably mounted on and carried by leader pins 14 which extend outwardly from the inner mold section. By tightening the bolt 83 more or less the initial warpage of the mold section 13 may be varied to effect the desired compensation for the counter-warping tendency due to the heat effect of the molten metal on the two inside mold surfaces.

Further modifications will be apparent to those skilled in the art and it is desired, therefore, that the invention be limited only by the scope of the appended claims.

Having thus described my invention, what I claim and desire to secure by Letters Patent is:

1. In a molding machine for molding battery parts, a mold comprising a pair of mold halves, means for rigidly supporting one of said mold halves at points adjacent the edge thereof, and means for drawing the center portion of said one mold half away from the other mold half with respect to said supporting means, whereby said one mold half may be mechanically warped to compensate for thermal warping of the other of said mold halves.

2. In a molding machine for molding battery parts, a mold comprising a pair of shallow, generally rectangular mold halves, means for rigidly supporting one of said mold halves at points adjacent the four corners thereof, and means for drawing the center portion of said one mold half away from the other mold half with respect to said supporting means, whereby said one mold half may be mechanically warped to compensate for thermal warping of the other of said mold halves.

3. In a molding machine for molding battery parts, a mold comprising a pair of shallow and substantially rectangular mold halves, one of said mold halves having adjacent each of the four corners of its broad outer side a true surface, a rigid backing member having four true surfaces engageable simultaneously with the four true surfaces on said one mold half, and adjustable draw means connected to said one mold half adjacent the center thereof for controllably drawing the center portion of said one mold half away from the other mold half with respect to said true surfaces, whereby said one mold half may be mechanically warped to compensate for thermal warping of the other of said mold halves.

4. In a molding machine for molding battery parts, a mold comprising a pair of shallow and substantially rectangular mold halves, one of said mold halves having adjacent each of the four corners of its broad outer side a true surface, a rigid backing member having four true surfaces engageable simultaneously with the four true surfaces on said one mold half, and a tension member threadedly engaging said one mold half adjacent the center thereof and anchored with respect to said true surfaces for controllably drawing the center portion of said one mold half away from the other mold half with respect to said true surfaces, whereby said one mold half may be mechanically warped to compensate for thermal warping of the other of said mold halves.

5. In a molding machine for molding battery grids, a mold comprising a pair of mold halves, means for rigidly supporting one of said mold halves at points adjacent the edge thereof, and means for drawing the center portion of said one mold half away from the other mold half with respect to said supporting means, whereby said one mold half may be mechanically warped to compensate for thermal warping of the other of said mold halves.

6. In a molding machine for molding battery grids, a mold comprising a pair of shallow, generally rectangular mold halves, means for rigidly supporting one of said mold halves at points adjacent the four corners thereof, and means for drawing the center portion of said one mold half away from the other mold half with respect to said supporting means, whereby said one mold half may be mechanically warped to compensate for thermal warping of the other of said mold halves.

7. In a molding machine for molding battery grids, a mold comprising a pair of shallow and substantially rectangular mold halves, one of said mold halves having adjacent each of the four corners of its broad outer side a true surface, a rigid backing member having four true surfaces engageable simultaneously with the four true surfaces on said one mold half, and adjustable draw means connected to said one mold half adjacent the center thereof for controllably drawing the center portion of said one mold half away from the other mold half with respect to said true surfaces, whereby said one mold half may be mechanically warped to compensate for thermal warping of the other of said mold halves.

8. In a molding machine for molding battery grids, a mold comprising a pair of shallow and substantially rectangular mold halves, one of said mold halves having adjacent each of the four corners of its broad outer side a true surface, a rigid backing member having four true surfaces engageable simultaneously with the four true surfaces on said one mold half, and a tension member threadedly engaging said one mold half adjacent the center thereof and anchored with respect to said true surfaces for controllably drawing the center portion of said one mold half away from the other mold half with respect to said true surfaces, whereby said one mold half may be mechanically warped to compensate for thermal warping of the other of said mold halves.

References Cited in the file of this patent

UNITED STATES PATENTS

| | | |
|---|---|---|
| 952,066 | Boswell | Mar. 15, 1910 |
| 1,936,280 | Williams | Nov. 21, 1933 |
| 2,479,191 | Williams et al. | Aug. 16, 1949 |